United States Patent
Hofmann et al.

(10) Patent No.: US 7,828,185 B2
(45) Date of Patent: Nov. 9, 2010

(54) ELECTRICAL HAND POWER TOOL WITH BATTERY PACK

(75) Inventors: Albrecht Hofmann, Steinenbronn (DE); Harald Krondorfer, Mundelein, IL (US); Markus Heckmann, Leinfelden-Echterdingen (DE); Kersten Heckmann, legal representative, Leinfelden-Echterdingen (DE); Joachim Schadow, Leinfelden-Echterdingen (DE); Thomas Schomisch, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 478 days.

(21) Appl. No.: 10/554,338

(22) PCT Filed: Dec. 11, 2003
(Under 37 CFR 1.47)

(86) PCT No.: PCT/DE03/04103
§ 371 (c)(1),
(2), (4) Date: Nov. 8, 2007

(87) PCT Pub. No.: WO2004/096500
PCT Pub. Date: Nov. 11, 2004

(65) Prior Publication Data
US 2008/0099224 A1    May 1, 2008

(30) Foreign Application Priority Data
Apr. 26, 2003    (DE) ................................ 103 18 947

(51) Int. Cl.
*B25F 5/00*    (2006.01)
*H01M 2/10*    (2006.01)

(52) U.S. Cl. ...................................... 227/156; 173/217

(58) Field of Classification Search ................. 227/123, 227/156; 173/217; 310/47, 50; 320/112
See application file for complete search history.

(56) References Cited

U.S. PATENT DOCUMENTS

| 3,757,194 | A | * | 9/1973 | Weber et al. ................. 320/112 |
| 3,973,179 | A | * | 8/1976 | Weber et al. ................. 320/113 |
| 3,999,110 | A | * | 12/1976 | Ramstrom et al. .......... 320/112 |
| 4,050,003 | A | * | 9/1977 | Owings et al. .............. 320/113 |
| 4,751,452 | A | * | 6/1988 | Kilmer et al. ............... 320/106 |
| 5,208,525 | A | * | 5/1993 | Lopic et al. ................. 320/112 |
| 5,251,105 | A | * | 10/1993 | Kobayashi et al. ..... 361/679.58 |
| 5,298,821 | A | * | 3/1994 | Michel ........................ 310/47 |
| 5,336,953 | A | * | 8/1994 | Allemann ..................... 310/50 |
| 5,360,153 | A | * | 11/1994 | Cooper ......................... 227/67 |
| 5,553,675 | A | * | 9/1996 | Pitzen et al. ................ 173/217 |
| 5,769,657 | A | * | 6/1998 | Kondo et al. ................ 439/500 |
| 6,018,227 | A | * | 1/2000 | Kumar et al. ............... 320/106 |

(Continued)

FOREIGN PATENT DOCUMENTS

CN    1383959    12/2002

(Continued)

*Primary Examiner*—Brian D Nash
(74) *Attorney, Agent, or Firm*—Michael J. Striker

(57) ABSTRACT

The invention relates to a hand power tool (2), having a housing (6), an electric motor accommodated in the housing (6), and a battery pack (4), releasably locked to the housing (6), for supplying the electric motor with electric current. At least one spring/damping element (38), mounted between the battery pack (4) and the housing (6) of the hand power tool (2), is provided, for damping vibration and -or eliminating a locking-dictated play between the battery pack (4) and the housing (6).

11 Claims, 2 Drawing Sheets

U.S. PATENT DOCUMENTS

Figure 1:
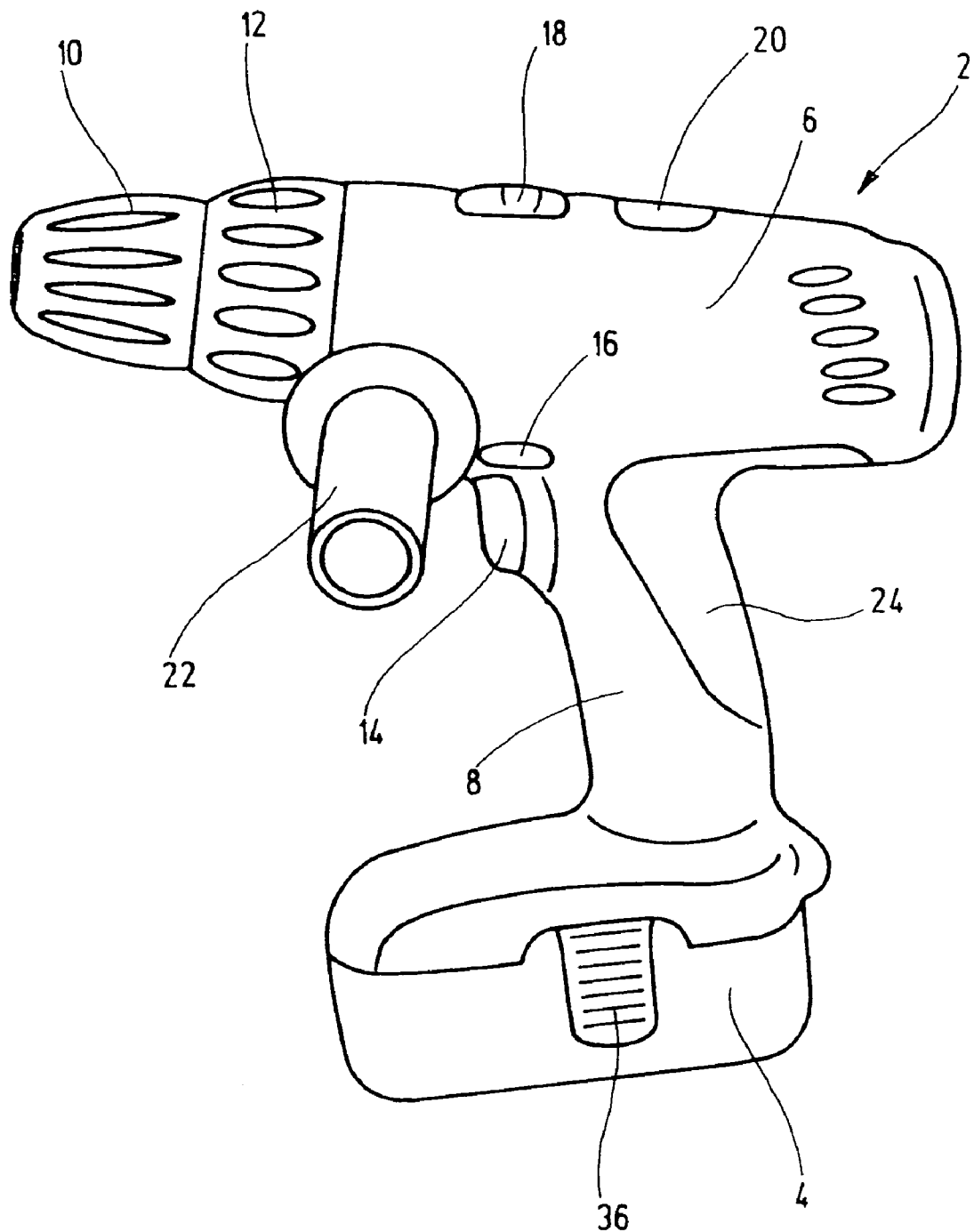

| | | | |
|---|---|---|---|
| 6,102,632 A * | 8/2000 | Potter et al. | 408/124 |
| 6,220,368 B1 * | 4/2001 | Ark et al. | 173/178 |
| 6,223,835 B1 * | 5/2001 | Habedank et al. | 173/217 |
| 6,357,533 B1 * | 3/2002 | Buchholz et al. | 173/217 |
| 6,357,534 B1 * | 3/2002 | Buetow et al. | 173/217 |
| 6,364,033 B1 * | 4/2002 | Hung et al. | 173/217 |
| 6,376,942 B1 | 4/2002 | Burger et al. | |
| 6,651,862 B2 | 11/2003 | Driscoll et al. | |
| 6,729,414 B2 * | 5/2004 | Cooper et al. | 173/217 |
| 6,786,380 B2 | 9/2004 | Driscoll et al. | |
| 6,995,541 B2 * | 2/2006 | Fukushima | 320/112 |
| 7,176,656 B2 * | 2/2007 | Feldmann | 320/114 |
| 2003/0116604 A1 | 6/2003 | Driscoll et al. | |
| 2009/0108806 A1 * | 4/2009 | Takano et al. | 320/112 |

FOREIGN PATENT DOCUMENTS

| | | |
|---|---|---|
| DE | 3901728 | 7/1990 |
| DE | 29802448 | 5/1998 |
| DE | 19911362 | 9/2000 |
| EP | 0804985 | 11/1997 |
| EP | 1260321 | 11/2002 |
| JP | 102966 | 11/1997 |
| JP | 10296660 | 11/1998 |

* cited by examiner

ELECTRICAL HAND POWER TOOL WITH BATTERY PACK

CROSS-REFERENCE TO A RELATED APPLICATION

The invention described and claimed hereinbelow is also described in German Patent Application DE 103 18 947.5, filed on Apr. 26, 2003. This German Patent Application provides the basis for a claim of priority of invention under 35 U.S.C. 119(a)-(d).

The invention relates to an electrical hand power tool, having a housing, a direct-current motor accommodated in the housing, and a battery pack, which can be locked to the housing, for supplying the direct-current motor with electric current.

PRIOR ART

Electrical hand power tools, such as percussion screwdrivers, power drills, right angle grinders, saber saws, circular saws, or planing machines for professional craftsmen or the do-it-yourselfer typically have either an alternating current motor or a direct-current motor as the driving motor. While the alternating current motor is as a rule supplied with alternating current from the power grid via a power cord, the electrical energy for supplying the direct-current motor is as a rule provided by a so-called battery pack, that is, a rechargeable battery in a housing that can be coupled to the housing of the hand power tool and that is connected electrically to the power supply lines of the direct-current motor when the two housings are coupled together. For coupling the two housings of the hand power tool and of the battery pack, the battery pack is typically provided with a protruding detent-locking device, which is inserted into a complementary insertion bush of the housing and locked in it.

To assure secure locking of the hand power tool and battery pack to one another, however, there must typically be a certain play between the protruding detent-locking device of the one component and the complementary insertion bush of the other component. As a consequence of this play, because of operation-caused vibration and the inertia of the battery pack, relative motion between the battery pack and the housing of the hand power tool occurs in operation of the hand power tool. In interplay with environmental factors, such as dust, these relative motions can cause wearing of detent elements of the detent-locking device, leading to greater play, to the extent of failure of the locking action.

ADVANTAGES OF THE INVENTION

The hand power tool of the invention having the characteristics of claim 1 has the advantage over the prior art that the at least one spring/damping element that is present between the battery pack and the housing of the hand power tool, because of its damping property, damps vibration-caused relative motions between the battery pack and the housing and simultaneously, by means of its spring property, eliminates the play between these components that is dictated by the locking. The absorption, caused by the damping, of a majority of the vibrational energy transmitted by the hand power tool to the battery pack and the shortening, effected by the reduction in the play, of vibration amplitudes of the vibration-caused relative motions have the effect that a vibration-caused wear of the detent elements can be largely avoided or greatly reduced. Moreover, with the battery pack locked in place, because of the absence of play between it and the housing of the hand power tool, the overall attractiveness of the hand power tool is of very high quality.

The spring/damping element or elements can be provided selectively on one of the two components, that is, on the housing of the hand power tool or on the battery pack, and when the two components are locked together they enter into touch engagement with the respective other component. Preferably, however, the spring/damping element or elements are provided on the component having the insertion bush, which as a rule is the housing of the hand power tool, because they are better protected against damage in the interior of the insertion bush than on the protruding detent-locking device of the other component.

The spring/damping element or elements preferably comprise a rubber-elastically deformable material, which has both damping and resilient properties. Examples of such a material include natural or synthetic rubber, silicone rubber, reversibly deformable soft foam, or some other elastomer. Especially economical manufacture of the hand power tool is attained if the spring/damping element or elements are made from a thermoplastic elastomer, and in the manufacture of the housing of the hand power tool are formed in one piece with the corresponding parts of the housing at the point or points provided or are formed integrally onto them. This is especially advantageous if the housing has additional parts of thermoplastic elastomer, such as a so-called soft grip on its grip part, which can then be injection-molded directly onto the housing together with the spring/damping elements in a single operation using 2K technology.

As an alternative, however, for eliminating the play, one or more spring elements may also be combined with one or more damping elements to reduce relative motions; in that case, it is fundamentally also possible to provide the spring elements at different places from the damping elements. For instance, one or more spring elements, made from a spring-elastic material, such as spring steel and mounted in the form of a leaf or spiral spring between the housing of the hand power tool and the battery pack, may be used in combination with one or more plastically deformable damping elements, such as gel cushions or the like, or the elasticity of the spring elements may be damped by suitable damping elements.

To prevent the unwanted relative motions between the battery pack and the housing of the hand power tool as effectively as possible, in a preferred feature of the invention it is provided that the spring/damping element, mounted on the housing or on the battery pack, enters into touch engagement with a surface of the respective other component oriented substantially perpendicular to a primary vibration direction of the hand power tool, and is preferably deformable in a direction that corresponds to this primary vibration direction. The primary vibration direction corresponds for instance in an orbital sander to its direction of oscillation, while in a percussion drill screwdriver it is oriented in the direction of the drill axis, which means that the location of the spring/damping elements may differ in different power tools. Also for this reason, mounting of the spring/damping elements on the power tool is preferred, since it makes it possible to use structurally identical battery packs for different power tools, without impairing the damping properties.

Preferably, a plurality of spring/damping elements are spaced apart from one another, to provide for uniform compensation for play on all sides of the battery pack and of the hand power tool. Especially good play compensation in the two primary directions of motion of the battery pack relative to the hand power tool is attained if at least some of the spring/damping elements are resiliently deformable in directions that are oriented parallel to the side walls of the battery pack or perpendicular to a direction of deflection of detent elements upon locking together of the battery pack and the housing.

DRAWINGS

Figure 2:
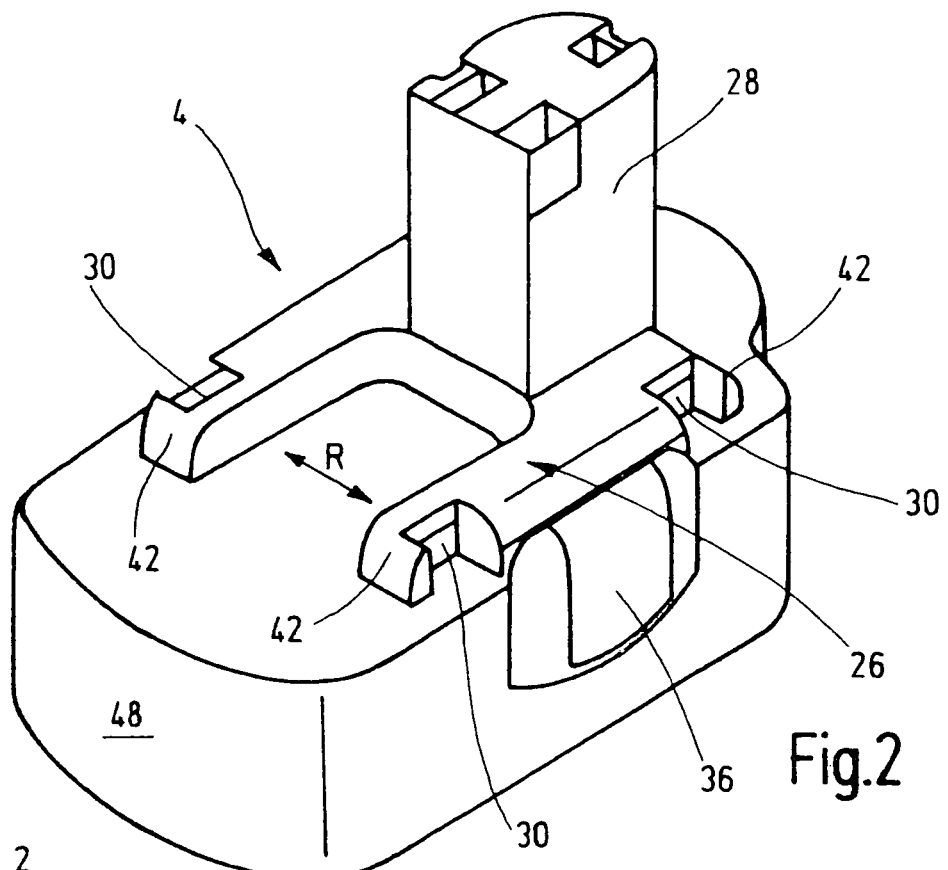
Figure 3:
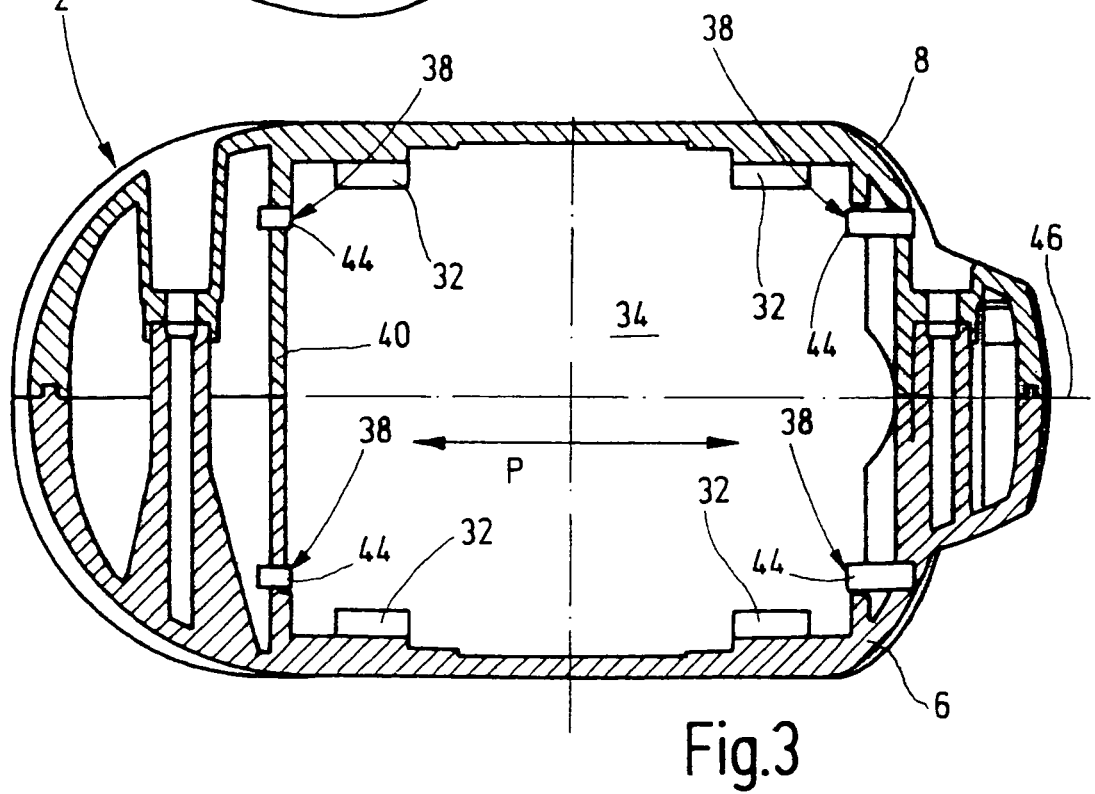

The invention will be described in further detail below in conjunction with the drawings, in terms of an exemplary embodiment. Shown are:

FIG. 1, a perspective view of an electric percussion drill screwdriver with a battery pack;

FIG. 2, a perspective view of the battery pack removed from the percussion drill screwdriver;

FIG. 3, a bottom view, partly in section, of a grip part of the percussion drill screwdriver with the battery pack removed.

DESCRIPTION OF THE EXEMPLARY EMBODIMENT

The electrical percussion drill screwdriver 2 with a battery pack 4 shown in the drawing essentially comprises a housing 6 with a grip part 8, an electric motor with a step-down gear (not shown), accommodated in the housing 6, a quick-action drill chuck 10, protruding past the housing 6 and driven by the step-down gear, for chucking a drill or screw insert (not shown), a torque adjusting ring 12 located between the fast-action drill chuck 10 and the housing 6, and the battery pack 4, locked releasably to the lower end of the grip part, for supplying direct current to the electric motor independently of the power grid.

The housing 6 of the percussion drill screwdriver 2 is provided, on the upper end of the grip part 8, with an on/off switch 14 and a rotation or direction-reversing switch 16 with an activation lock and on its top, it has a switch 18 for first and second gear and also has a magnet plate 20. An additional handle 22 is releasably secured to one side of the housing 6. The grip part 8 is provided, on its side facing away from the on/off switch 14, with a so-called soft grip 24, that is, a pad or cushion of a thermoplastic elastomer material that is injection-molded onto the grip part 8 in the manufacture of the housing 6 by the 2K technique.

As best shown in FIG. 2, the battery pack 4, separated from the percussion drill screwdriver 2, is provided on its top with a substantially U-shaped detent-locking device 26 and with a contact base 28 protruding upward past the detent-locking device 26. The detent-locking device 26 includes four detent elements, which when the battery pack is secured to the grip part 8 of the housing 6 enter into engagement with corresponding detent lugs 32 in an insertion bush 34 on the underside of the grip part 8 of the housing 6 (see FIG. 3); this bush serves the purpose of introducing the detent-locking device 26 in the contact base 28. For releasing the battery pack 4 from the grip part 8, the detent elements 30 can be shifted out of engagement with the detent lugs 32 with the aid of two push buttons 36, provided on opposite broadside faces of the battery pack 4.

As best shown in FIG. 3, the housing 6 of the percussion drill screwdriver 2, in the interior of the insertion bush 34 serving the purpose of introduction of the detent-locking device 26 in the contact base 28, with a total of four spring/damping elements 38. The task of these damping elements 38 is to minimize the play that exists between the battery pack 4 and the housing 6 after the battery pack 4 has been locked in the insertion bush 34, and to provide damping of the vibration that is transmitted from the housing 6 to the battery pack 4.

The spring/damping elements 38 comprise the same thermoplastic elastomer as the soft grip 24 on the outside of the grip part 8 and are injection-molded simultaneously with the housing 6 onto the grip part 8 in the production of the housing 6 and thereby joined integrally to the housing 6. To assure the securest possible seating of the spring/damping elements 38, an inner wall 40 of the housing 6, provided with the spring/damping elements 38, may be provided with a through opening (not shown), in the installation region of each spring/damping element 38, the dimensions of which opening are smaller than the dimensions of the spring/damping element 38 on both sides of the through opening, so that the spring/damping element 38 is held firmly in the opening by form-locking engagement.

In the percussion drill screwdriver 2 shown in the drawing, the spring/damping elements 38 are mounted such that after the battery pack 4 has been locked to the housing 6 of the percussion drill screwdriver 2, they are braced against four paired, opposed surfaces 42 of the detent-locking device 26 that are diametrically opposite the paired spring/damping elements 38. The surfaces 42 of the detent-locking device 26 and the free face ends 44, resting against them, of the spring/damping elements 38 are oriented such that they are perpendicular to a drill axis 46 of the percussion drill screwdriver 2 and thus perpendicular to a primary vibration direction P of the housing 6 that occurs in percussion drilling. As a result, the vibrational energy, exerted on the spring/damping elements 38 in this direction, is dissipated especially well, and between the battery pack 4 and the housing 6, relative motions of great vibrational amplitude are prevented.

As can be seen from FIG. 2, the bearing faces 44 of the spring/damping elements 38 are also located essentially perpendicular to the direction R in which the four detent elements 30 of the detent-locking device 26 deflect upon introduction into the insertion bush 34.

Compared to the adjoining parts of the housing 6, the spring/damping elements 38 protrude slightly into the interior of the insertion bush 34, so that they do not hinder the introduction of the detent-locking device 26 into the insertion bush 34, yet after the locking has been done rest essentially without play against the surfaces 42 of the detent-locking device 26.

To facilitate the introduction of the detent-locking device 26 into the insertion bush 34, the surfaces 42, with increasing distance from the top of the battery pack 4 away from its outer face-end faces 48, are rounded, which also facilitates the introduction of the surfaces 42 between the paired, spaced-apart, diametrically opposed spring/damping elements 38.

The invention claimed is:

1. A hand power tool, having a housing (6), an electric motor accommodated in the housing, a battery pack (4), releasably locked to the housing with a detent-locking device (26) and having detent elements (30), for supplying the electric motor with electric current, and at least one spring-like damping element (38), mounted between the battery pack (4) and the housing (6) of the hand power tool (2), for damping vibration and for eliminating a locking-dictated play between the battery pack (4) and the housing (6), wherein said at least one spring-like damping element (38) is provided in said housing and is integrally joined to said housing (6) and wherein the at least one spring-like damping element (38) is configured to rest against a surface (42) of the detent-locking device (24) and is deformable in a direction (R) of deflection of the detent elements (30) upon locking together of the battery pack (4) and the housing (6).

2. The hand power tool according to claim 1, characterized in that at least one spring-like damping element (38) enters into touch engagement with the battery pack (4) upon locking together of the battery pack (4) and the housing (6).

3. The hand power tool according to claim 2, characterized in that the spring-like damping element (38) enters into touch engagement with a surface (42) oriented substantially perpendicular to a primary vibration direction (P) of the hand power tool.

4. The hand power tool according to claim 3, characterized in that the surface (42) is inclined or rounded.

5. The hand power tool according to claim 1, characterized in that the spring-like damping element (38) is deformable in a direction that corresponds to a primary vibration direction (P) of the hand power tool.

6. The hand power tool according to claim 1, characterized in that the spring-like damping element (38) is deformable in a direction that is perpendicular to a direction (R) of a deflection of detent elements (32) upon locking together of the battery pack (4) and the housing (6).

7. The hand power tool according to claim 1, characterized in that the spring-like damping element (38) comprises a rubber-elastic material.

8. The hand power tool according to claim 1, characterized in that the spring-like damping element (38) comprises a material that is joined integrally to the housing (6) by injection molding.

9. The hand power tool according to claim 1, characterized in that the spring-like damping element (38) comprises a thermoplastic elastomer.

10. The hand power tool according to claim 1, characterized in that a plurality of spring-like damping elements (38) are spaced apart from one another and integrally joined to the housing.

11. The hand power tool according to claim 1, characterized in that the spring-like damping element comprises one spring element and one damping element.

* * * * *